United States Patent
Zuber et al.

(10) Patent No.: US 7,337,587 B2
(45) Date of Patent: *Mar. 4, 2008

(54) CONSTRUCTION ASSEMBLY OF PLASTER BOARDS AND A METHOD OF ASSEMBLING A PLURALITY OF PLASTER BOARDS

(75) Inventors: Francois Zuber, Vedene (FR); Claude Leclercq, Pernes-les-Fontaines (FR); Pascal Bourne-Chastel, Mormoiron (FR)

(73) Assignee: Lafarge Platres, Avignon Cedex (FR)

( * ) Notice: Subject to any disclaimer, the term of this patent is extended or adjusted under 35 U.S.C. 154(b) by 392 days.

This patent is subject to a terminal disclaimer.

(21) Appl. No.: 10/857,504

(22) Filed: Jun. 1, 2004

(65) Prior Publication Data

US 2004/0216424 A1 Nov. 4, 2004

Related U.S. Application Data

(63) Continuation of application No. 10/308,084, filed on Dec. 3, 2002, now Pat. No. 7,208,225, which is a continuation of application No. 09/633,264, filed on Aug. 4, 2000, now abandoned, which is a continuation of application No. 09/316,013, filed on May 21, 1999, now Pat. No. 6,105,325, which is a continuation of application No. 08/793,444, filed on May 9, 1997, now abandoned.

(30) Foreign Application Priority Data

Jun. 30, 1995 (FR) .................................... 95 08153

(51) Int. Cl.
| | |
|---|---|
| C04B 11/00 | (2006.01) |
| C04B 26/00 | (2006.01) |
| C04B 28/00 | (2006.01) |
| E04B 2/00 | (2006.01) |
| E04F 13/02 | (2006.01) |

(52) U.S. Cl. .................. 52/417; 52/742.14; 52/742.16; 156/71; 106/772; 106/784; 106/732; 524/42; 524/425; 427/403

(58) Field of Classification Search .................. 52/417, 52/742.14, 742.16; 106/197.01, 772–774, 106/778, 780, 784, 730, 732; 524/42, 44, 524/423, 425, 431, 445, 451; 156/71; 427/402, 427/403

See application file for complete search history.

(56) References Cited

U.S. PATENT DOCUMENTS

| | | | |
|---|---|---|---|
| 1,439,289 | A | 12/1922 | Buttress |
| 1,993,472 | A | 3/1935 | Borsari-Fischer |
| 2,109,719 | A | 3/1938 | Brusse |
| 2,205,423 | A | 6/1940 | Lefebure |
| 2,754,795 | A | 7/1956 | Enssle |
| 2,770,216 | A | 11/1956 | Schock |
| 2,833,139 | A | 5/1958 | Bosshard |
| 2,925,631 | A | 2/1960 | Larson et al. |
| 3,003,979 | A | 10/1961 | Ptasienski et al. |
| 3,180,058 | A | 4/1965 | Tillisch et al. |
| 3,256,223 | A | 6/1966 | Heijmer |
| 3,284,980 | A | 11/1966 | Dinkel |
| 3,303,147 | A | 2/1967 | Elden |
| 3,382,119 | A | 5/1968 | Henkel |
| 3,411,926 | A | 11/1968 | Gogek et al. |
| 3,422,587 | A | 1/1969 | Murray |
| 3,576,091 | A | 4/1971 | Shull, Jr. |
| 3,630,742 | A | 12/1971 | Crawford et al. |
| 3,708,935 | A | 1/1973 | Kossuth et al. |
| 3,819,395 | A | 6/1974 | Yocum |
| 3,835,074 | A | 9/1974 | Desmarais |
| 3,907,725 | A | 9/1975 | Forte et al. |
| 3,975,320 | A | 8/1976 | Lane et al. |
| 3,984,596 | A | 10/1976 | Failmezger |
| 4,018,732 | A | 4/1977 | Lakshmanan |
| 4,020,237 | A * | 4/1977 | von Hazmburg ............ 428/535 |

(Continued)

FOREIGN PATENT DOCUMENTS

AU 19322/92 1/1993

(Continued)

OTHER PUBLICATIONS

Dan Eklund, "The Influence of Binders and Pigments upon the K&N Ink Absorption of Coated Papers", No. 9, 1973, Papper och Trä.

(Continued)

Primary Examiner—Robert Canfield
(74) Attorney, Agent, or Firm—Buchanan Ingersoll & Rooney, PC

(57) ABSTRACT

A construction assembly includes a plurality of plaster boards, each of the plaster boards having a plaster body and at least one sheet of liner, the liner including an inner surface attached to the plaster body and an outer surface having an outer face; wherein said plaster boards are assembled creating at least one joint; and a joint-pointing coat jointing said plaster boards to form a substantially plane outer surface including the outer surface of said at least one joint and said outer surface of said liner, wherein the composition of the joint-pointing coat is adapted for the finishing of said at least one joint; wherein both the joint-pointing coat in the dry state and the outer face of the sheet of liner are adapted to form an overall surface having a substantially homogeneous coloration.

55 Claims, No Drawings

U.S. PATENT DOCUMENTS

| | | |
|---|---|---|
| 4,117,183 A | 9/1978 | Long |
| 4,178,273 A | 12/1979 | Brown |
| 4,205,041 A | 5/1980 | Hymes |
| 4,238,239 A * | 12/1980 | Brown .......................... 524/5 |
| 4,287,103 A * | 9/1981 | Green et al. .................. 524/47 |
| 4,294,622 A * | 10/1981 | Brown ........................ 524/394 |
| 4,372,814 A * | 2/1983 | Johnstone et al. .......... 162/124 |
| 4,448,639 A | 5/1984 | Long |
| 4,454,267 A * | 6/1984 | Williams ...................... 524/43 |
| 4,558,079 A | 12/1985 | Desmarais |
| 4,579,610 A | 4/1986 | Kole et al. |
| 4,657,594 A | 4/1987 | Struss |
| 4,661,164 A | 4/1987 | Severinghaus, Jr. |
| 4,672,787 A | 6/1987 | Murphy |
| 4,686,253 A | 8/1987 | Struss et al. |
| 4,720,303 A | 1/1988 | Soldatos |
| 4,725,477 A | 2/1988 | Kole et al. |
| 4,743,475 A | 5/1988 | Negri et al. |
| 4,820,754 A | 4/1989 | Negri et al. |
| 4,845,152 A | 7/1989 | Palmer |
| 4,859,248 A | 8/1989 | Thaler et al. |
| 4,959,272 A | 9/1990 | Long |
| 4,965,031 A | 10/1990 | Conroy |
| 4,972,013 A * | 11/1990 | Koltisko et al. ............. 524/211 |
| 4,988,543 A | 1/1991 | Houle et al. |
| 5,019,195 A | 5/1991 | Skinner |
| 5,039,341 A | 8/1991 | Meyer |
| 5,055,323 A | 10/1991 | Kole et al. |
| 5,079,042 A * | 1/1992 | Frings ........................ 427/403 |
| 5,088,260 A * | 2/1992 | Barton et al. ................. 52/416 |
| 5,102,462 A | 4/1992 | Podlas |
| 5,143,757 A | 9/1992 | Skinner |
| 5,207,830 A | 5/1993 | Cowan et al. |
| 5,230,200 A * | 7/1993 | Douglas et al. ............. 52/746.1 |
| 5,258,069 A | 11/1993 | Knechtel et al. |
| 5,277,712 A | 1/1994 | McInnis |
| 5,334,243 A | 8/1994 | Hyman |
| 5,336,318 A | 8/1994 | Attard et al. |
| 5,487,250 A | 1/1996 | Yount et al. |
| 5,552,187 A | 9/1996 | Green et al. |
| 5,653,797 A | 8/1997 | Patel |
| 5,714,032 A | 2/1998 | Ainsley et al. |
| 5,746,822 A | 5/1998 | Espinoza et al. |
| 5,779,786 A | 7/1998 | Patel |
| 5,869,166 A | 2/1999 | Caldwell |
| 5,908,521 A | 6/1999 | Ainsley et al. |
| 5,908,821 A | 6/1999 | Labeque et al. |
| 5,922,447 A | 7/1999 | Baig |
| 5,945,198 A | 8/1999 | Deodhar et al. |
| 5,987,835 A | 11/1999 | Santarossa |
| 6,077,966 A | 6/2000 | Matsumura et al. |
| 6,105,325 A * | 8/2000 | Zuber et al. .................. 52/416 |
| 6,106,607 A | 8/2000 | Be et al. |
| 6,165,261 A | 12/2000 | Wantling |
| 6,171,388 B1 | 1/2001 | Jobbins |
| 6,177,180 B1 | 1/2001 | Bodine et al. |
| 6,221,521 B1 | 4/2001 | Lynn et al. |
| 6,238,476 B1 | 5/2001 | Sprinkle |
| 6,268,042 B1 | 7/2001 | Baig |
| 6,436,185 B1 * | 8/2002 | Ayambem et al. .......... 106/793 |
| 6,645,291 B2 * | 11/2003 | Ayambem et al. .......... 106/793 |
| 6,663,979 B2 | 12/2003 | Deodhar et al. |
| 6,673,144 B2 * | 1/2004 | Immordino et al. ........ 106/778 |
| 6,733,581 B2 | 5/2004 | Langford |
| 7,047,701 B2 * | 5/2006 | Bonetto et al. ............... 52/415 |
| 2002/0086114 A1 | 7/2002 | Madsen |
| 2002/0121326 A1 | 9/2002 | Adler et al. |
| 2003/0084633 A1 | 5/2003 | Zuber et al. |
| 2003/0085306 A1 | 5/2003 | John et al. |
| 2003/0113572 A1 | 6/2003 | Deodhar et al. |
| 2003/0153651 A1 * | 8/2003 | Bonetto et al. ................ 524/2 |
| 2004/0154264 A1 | 8/2004 | Colbert |
| 2004/0209074 A1 | 10/2004 | Randall et al. |
| 2004/0237436 A1 | 12/2004 | Zuber et al. |
| 2005/0065256 A1 | 3/2005 | Kyte et al. |
| 2005/0229519 A1 * | 10/2005 | Colbert et al. ................ 52/416 |
| 2005/0234174 A1 * | 10/2005 | Colbert et al. .............. 524/425 |
| 2005/0246993 A1 * | 11/2005 | Colbert et al. ................ 52/459 |
| 2005/0252128 A1 | 11/2005 | Colbert et al. |
| 2006/0048684 A1 * | 3/2006 | Bonetto et al. ............. 106/772 |

FOREIGN PATENT DOCUMENTS

| | | |
|---|---|---|
| AU | 719427 | 5/2000 |
| CA | 2259115 | 8/1999 |
| DE | 142 872 | 7/1980 |
| DE | 37 21 668 A1 * | 1/1989 |
| DE | 37 21 668 A1 | 5/1989 |
| DE | 43 24 315 | 10/1994 |
| DE | 4331141 A1 | 3/1995 |
| EP | 0 521 804 A1 * | 6/1992 |
| EP | 0 496 682 | 7/1992 |
| EP | 0496682 A1 | 7/1992 |
| EP | 0 521 804 A1 | 7/1993 |
| EP | 1 182 235 | 2/2002 |
| FR | 2166536 | 8/1973 |
| FR | 2 505 908 | 3/1982 |
| FR | 2 736 079 | 3/1997 |
| FR | 2736079 | 3/1997 |
| FR | 2818635 | 6/2002 |
| FR | 2818968 | 7/2002 |
| GB | 1513763 | 6/1978 |
| GB | 2228931 | 9/1990 |
| JP | 60-065197 | 4/1985 |
| JP | 09-109131 | 4/1997 |
| WO | 97/02395 | 1/1997 |
| WO | 99/08979 | 2/1999 |
| WO | 99/48833 | 9/1999 |
| WO | 99/57371 | 11/1999 |
| WO | 00/06518 | 2/2000 |
| WO | 02/06183 A1 * | 1/2002 |
| WO | 02/12144 A2 | 2/2002 |
| WO | 02/012144 A3 * | 2/2002 |
| WO | 02/058902 A2 | 8/2002 |
| WO | 2005/040475 | 5/2005 |

OTHER PUBLICATIONS

International Preliminary Examination Report issued in a corresponding PCT Application.

Tech Talk, National Gypsum Company, George Kutcher, Revisiting the Levels of Gypsum Board Finish, 3 pages, Mar. 2004.

"Acumer® 9400—Dispersant for Paper and Paperboard Coatings", Rohm and Haas Company, Special Polymers.

"Acumer® 9300—Dispersant for Paper and Paperboard Coatings", Rohm and Haas Company, Special Polymers.

George M. Kutcher, Jr., CDT, CSI, "Revisiting the Levels of Gypsum Board Finish", National Gypsum Company, pp. 1-3, Mar. 2004.

New Zealand Opposition Paper in Patent No. 527112 dated Dec. 18, 2006.

Decision, Jun. 14, 2005, Appeal No. T 1032/03-3.2.3, and translation thereof.

Chemical Abstracts, vol. 103, No. 8, Aug. 26, 1985, Abstract No. 58270z, page 278; XP 000185205; Abstract of JP 60 065197.

Database WPI, Week 199727, AN 1997-293470, XP002198594, Abstract of JP 09 109131.

Derwent WPI AN 1997-109001, Week 199710, Abstract of WO 9702395.

Derwent WPI AN 1989-016493, Week 198903, English Abstract of DE 3721668.

Derwent WPI AN 1993-002309, Week 199301, English Abstract of EP 0521804.

J.R. Gorman, et al., "Plaster and Drywall Systems Manual," BNI Books, Division of Building News, Inc., Apr. 12, 2003, pp. 240 and 251.

The White Book 1986 Edition, British Gypsum, Apr. 12, 2003.

The White Book, Plasterboard Fixing, Jointing and Decorating, British Gypsum, Apr. 12, 2003.

G.D. Plumb, M.A., Lightweight Partitions Having Improved Low Frequency Sound Insulations, Research and Development Department, 10 pages, Jun. 1995.

White, Medium Calcium Carbonate Filler, Georgia Marble Company, May 1996.

Water Absorbency of Bibulous Papers, T 432 cm—99, Approved by the Physical Properties Committee of the Process and Product Quality Division, 1999.

Water Absorbency of Bibulous Papers, T 432 om —94, Approved by the Chemical Properties Committee of the Process and Product Quality Division, 1994.

Standard Conditioning and Testing Atomspheres for Paper, Board, Pulp Handsheets and Related Products, T 402 om—93, Approved by the Physical Properties Committee of the Process and Product Quality Division, 1993.

Gypsum Plasterboards, Mar. 1995, 30 pages.

Ken A. Phillips, et al., Industrial Minerals in Arizona's Wallboard Joint Cement Industry, Jul. 1989, 6 pages.

Ken Phillips, et al., Industrial Minerals in Southern California's Wallboard Joint Cement Industry, Sep. 1989, 6 pages.

Gypsum Plasterboard—Part 1: Specification for Plasterboard Excluding Material Submitted to Secondary Operations, 1985, 10 pages.

Dry Lining and Partitioning Using Gypsum Plasterboard, British Standard, 1995, 50 pages.

Sauli Rennes, et al., The Influence of Binders on the Structure and Water Sorption of Coated Paper, pp. 698-703, Jun. 1989.

Technical Data, Calmote Ad, Omya UK, Jan. 1997.

Attagel 50, Engelhard, Jan. 3, 2003.

Engelhard Material Safety Data Sheet, Lawrence Industries, Aug. 19, 1992.

Fordamin Stinnes Logistics, Fordacal S2 Talc, Mar. 2001.

Defoamers for Emulsion Paints and Emulsion Plasters, BYK Chemie, 4 pages.

4 Walocel M Delivery Programme.

Emultex 596, Synthomer International Technology Individual Service, Jul. 2002.

Sil-Cell 35/34, Silbrico Corporation, 2 pages, 1993.

Methocel Cellulose Ethers for Gypsum-Based Building Materials, How Methocel Cellulose Ethers Products Maximise the Performance of Gypsum-based Building Materials, Aug. 1999.

Elotex LIQ2020, Technical Data Sheet, Mar. 14, 2002.

Twinstar Chemicals Limited, Benzoflex 9-88 Plasticiser Dipropyleneglycol Dibenzoate, 5 pages, Jun. 1996.

International Search Report and Attached Written Opinion mailed by the International Bureau on Nov. 7, 2005 in corresponding PCT/EP2005/003990.

International Search Report and Attached Written Opinion mailed by the International Bureau on Dec. 8, 2005 in corresponding PCT/EP2005/003991.

Machine Translation DE 4324315 A (1994).

Rheological Aspects of Carboxymethyl Cellulose Acetate Butyrate (CMCABTM) in Waterborne Coatings, Jun. 25, 2003; SpecialChem S.A., © 2007.

* cited by examiner

CONSTRUCTION ASSEMBLY OF PLASTER BOARDS AND A METHOD OF ASSEMBLING A PLURALITY OF PLASTER BOARDS

CROSS-REFERENCE TO RELATED APPLICATIONS

This is a continuation of Ser. No. 10/308,084 filed Dec. 3, 2002 now U.S. Pat. No. 7,208,225, which is a continuation of Ser. No. 09/633,264 filed Aug. 4, 2000, now abandoned, which is continuation application of U.S. patent application Ser. No. 09/316,013, filed May 21, 1999 now U.S. Pat. No. 6,105,325, which is a continuation application of U.S. patent application Ser. No. 08/793,444, filed May 9, 1997 now abandoned, the disclosure of which is hereby incorporated by reference.

FIELD OF THE INVENTION

The present invention relates to the construction of interior works. More particularly, the invention is concerned with any construction method, involving flat prefabricated elements, especially boards, and at least one joint-pointing coat which can be used especially for the finishing of a joint. The flat prefabricated elements comprise a plaster board and at least one sheet of lining paper, at least one outer layer of which has a visible outer face ready to be decorated. The said flat elements are assembled together, especially with a coat, and the joints are finished with the said joint-pointing coat, so as to obtain an overall visible outer surface which is relatively uniform or plane, including in the region of the joints. Such a method is employed, for example, when plasterboards covered with a cardboard lining having a joint-pointing coat are assembled, for the purpose of defining spaces within a building, especially partitions.

DESCRIPTION OF RELATED ART

According to the document EP-A-0,521,804, the lining paper may comprise an upper layer, called an upper web, comprising white cellulose fibres, mainly synthetic, and a mineral filler of light colour, preferably white, and a pigment layer covering the upper layer, comprising a mineral filler of light colour, preferably white, and a binder.

In general the overall visible outer surface obtained according to the above-defined method needs to be prepared, before receiving any surface decoration, such as one or more layers of a film covering of the paint or lacquer type or a wallpaper. This preparation is necessitated especially by the shade or colour differences existing between the visible outer surface of the flat prefabricated elements, for example plasterboards, and the visible outer surface of the joints. After the interior work has been completed, this preparation involves covering the overall surface obtained, i.e. the lining of the flat prefabricated elements plus the joints, with one or more layers of a paint or priming or finishing coat.

The preparation operation represents an appreciable additional cost, for example in a complete process for the construction of a building. And in some cases, it is still insufficient for obtaining an overall decorated surface of uniform appearance, particularly in view of the physico-mechanical differences prevailing between the joints and the flat prefabricated elements.

SUMMARY OF THE INVENTION

The object of the present invention is to overcome the abovementioned disadvantages. More specifically, the object of the invention is a construction method breaking with the traditional approach adopted for solving the problem explained above, that is to say avoiding the need for a preparation of the overall surface, before any decoration. However, the object of the invention is a method which remains compatible with the practices of the professionals in the construction industry, especially those involved in interior works.

According to the present invention, the method differs from the traditional approach in that, the structure and/or composition of the sheet of lining paper and the composition of the joint-pointing coat are coordinated with one another in order, in the dry state of the joint-pointing coat, to obtain an overall surface having one or more physical characteristics, including colour or shade, which are substantially homogeneous in virtually the entire overall surface, including in the region of the visible outer face of the joints.

According to other objects of the invention a construction assembly for interior works is provided, comprising, flat prefabricated elements, especially boards, and, a joint-pointing coat capable of being used especially for the finishing of a joint. The flat prefabricated elements comprise a plaster body and at least one sheet of lining paper, at least one outer layer of which has a visible outer face ready to be decorated. In this assembly, the structure and/or composition of the sheet of lining paper and the composition of the joint-pointing coat are coordinated with one another in order, in the dry state of the joint-pointing coat, to obtain an overall surface having one or more physical characteristics, including colour or shade, which are substantially homogeneous in virtually the entire overall surface, including in the region of the visible outer face of the joints.

A joint-pointing coat, intended to be used in the method or the assembly according to the invention, is also provided.

The present invention affords the following decisive advantages which result from the surface homogeneity of the overall surface obtained according to the present invention, not only in terms of colour or shade, but also in terms of particular physical or physico-chemical characteristics.

Thus, by homogenizing the surface absorption capacity of the lining paper and of the joint-pointing coat, a virtually perfect appearance of the paint layer or paint layers and a virtually uniform adhesion of a wallpaper can be obtained. This subsequently is conducive to the homogeneous detachment of the wallpaper.

DESCRIPTION OF THE PREFERRED EMBODIMENTS

In a preferred version of the invention, there is a sealing coat intended for forming essentially the joints between the various flat elements, with the joint-pointing coat being a finishing coat which can be applied to the sealing coat.

According to an advantageous embodiment of the invention, when there are preexisting flat prefabricated elements, the composition of the joint-pointing coat is coordinated with the structure and/or composition of the sheet of lining paper.

According to another version of the invention, and converse to the foregoing, for a preexisting joint-pointing coat, the composition of the sheet of lining paper is coordinated with the composition of the joint-pointing coat.

Moreover, the method is more preferably characterized in that, in addition to the colour or shade, at least any one of the following physical characteristics is homogenized or matched between flat prefabricated elements and the joint-pointing coat, namely:

the surface appearance, including reflectance;

the absorption of surface water;

decoloration or coloration under the effect of natural light.

Advantageously, these various physical characteristics are defined as follows:

the reflectance factor of the overall surface, including that of the visible outer face of the joints, is between 70% and 80%, and preferably between 72% and 76%, for a wavelength of 457 nm;

the decoloration or coloration of the overall surface, including that of the visible outer face of the joints, has a colour deviation (delta E*) at most equal to 3 after exposure for 72 hours to a source of UV radiation arranged at 15 cm from the surface and having a wavelength at least equal to 290 nm;

the surface water absorption of the overall surface, including that of the visible outer face of the joints, is not less than 60 minutes and/or is at most equal to 15 $g/m^2$ according to the COBB test, at 23° C.

In practice, and by means of routine tests, the average person skilled in the art knows how to coordinate the structure and/or composition of a sheet of lining paper and/or the composition of a coat, so as to satisfy the above-defined technical principles. As a result, the examples described below are in no way limiting.

The present invention will now be described by taking flat prefabricated elements, plasterboards, as an example. These boards are typically composed of a factory-cast plaster body between two sheets of paper forming both its lining and its reinforcement.

Conventionally, one of the sheets of paper used for making the plasterboards has a dark colour which can vary between a grey colour and a chestnut colour, since it is composed of cellulose fibres which have not undergone any particular purifying treatment. Traditionally, this so-called grey paper is obtained from unbleached chemical pulp and/or from mechanical pulp, and/or from thermomechanical pulp and/or from semi-chemical pulp. By mechanical pulp, it is usually meant a pulp obtained entirely by mechanical means from various raw materials, essentially wood, which can be provided by salvaged products originating from wood, such as old cardboard boxes, trimmings of kraft paper and/or old newspapers. Thermomechanical pulp means a pulp obtained by thermal treatment followed by a mechanical treatment of the raw material. By semi-chemical pulp is meant a pulp obtained by eliminating some of the non-cellulose components from the raw material by means of chemical treatment and requiring a subsequent mechanical treatment in order to disperse the fibres.

The other sheet of plasterboards has a visible face, called a lining face, of a colour generally lighter than the grey sheet. To obtain this lighter colour, the layer or layers of this face are based on chemical pulp, if appropriately bleached, composed of recycled and/or new cellulose fibres, and/or on mechanical pulp, if appropriately bleached. By chemical pulp is meant a pulp obtained by eliminating a very large proportion of the non-cellulose components from the raw material by chemical treatment, for example, by cooking in the presence of suitable chemical agents, such as soda or bisulphites. When this chemical treatment is completed by bleaching, a large part of the coloured substances is eliminated, as well as the substances which risk decomposing by ageing and giving unpleasant yellow shades associated with the presence of, for example, lignin.

In a preferred embodiment of the method of the invention, and according to the document EP-A-0 521 804, the content of which is incorporated by reference, the lining paper comprises an upper layer, called an upper web, comprising white cellulose fibres, mainly synthetic, a mineral filler of light colour, preferably white, and a pigment layer covering the upper layer. The pigment layer comprises a mineral filler of light colour, preferably white, and a binder. Correspondingly, according to the present invention, the joint-pointing coat comprises a mineral filler of light colour, preferably white, the grain size of which is between 5 and 35 µm.

The fineness of the grain size of the mineral filler of the joint-pointing coat makes it possible to obtain a smooth surface corresponding to that of the lining of the board. Too large a grain size of the filler gives rise to overall surface defects, such as a reflection of light radiation on the surface of the coat which is different from that on the surface of the board, bringing about differences in tone and brightness of the shade. Too large a grain size also gives rise to differences in physical appearance which are associated with the differences in roughness between the board and the coat.

The mineral filler represents preferably between 50% and 85% of the total weight of the joint-pointing coat.

Moreover, the coat can comprise a hydrophobic agent, for example between 0.2% and 5%, and preferably between 0.5% and 3%, of the total weight of the coat, for example a silicone derivative. This agent slows the drying kinetics of the coat, which is conducive to the non-cracking of the coat. Also, this agent has higher resistance to the attack of steam during operations for the removal of wallpaper, so that the removal can be achieved without thereby impairing the good bonding of a paint or paper adhesive on the overall surface, including the visible surface of the joints. In fact, this hydrophobic agent makes it possible to level off the absorbent capacities of the surfaces of the coat and of the lining paper of the board. Thus, all paints or paper adhesives applied to the overall surface obtained exhibit little shift in absorption kinetics between the coat and the board, thus making it possible to avoid the appearance of spectra or of defects in shade homogeneity.

The coat also comprises an organic binder dispersible in aqueous phase, in a proportion of between 1 and 20%, and preferably between 2 and 12%, of the total weight of the joint-pointing coat, for example polyvinyl acetates and/or acrylic acid esters. The choice of this binder is important, since it must impart sufficient flexibility to the coat to withstand mechanical stresses, and it must have both an adhesive capacity for obtaining a good bond on the overall surface and good resistance to the attacks of UV light.

Moreover, a handling agent is provided in the composition of the coat, especially a water-retaining and thickening agent, for example methylhydroxyethyl-cellulose, in a proportion of 1 to 15%, and preferably of 2 to 12%, of the total weight of the joint-pointing coat.

Finally, at least one slipping agent can be included in the composition of the coat, especially a clay, in the proportion of 0.1 to 2%, and preferably of 0.1 to 0.6%, of the total weight of the joint-pointing coat. These clays are preferably silicate derivatives and more preferably clays of the attapulgite type.

Other components, such as biocides, dispersants, antifoaming agents and pigments can also be incorporated in the composition of the coat in the conventional way.

The invention will be understood better from the following detailed example given as a non-limiting indication.

We proceed from plasterboards similar to Example 5 of document EP-A-0 521 804, which are assembled by means of a conventional sealing joint, for example a joint coat sold under the registered trade mark of "PREGYLYS"® of the Company PLATRES LAFARGE. The upper web of the lining of the board is obtained from 65% bleached synthetic cellulose fibres and 35% talcum and is covered with a pigment layer comprising, as mineral filler, 85% by weight of $CaSO_4, 2H_2$ in the form of needles of a length of between 3 and 5 µm and, as a binder, 10.3% by weight of styrene-butadiene copolymer. The sealing joint subsequently receives a thin layer of a joint-pointing coat according to the invention, having the following composition:

50 to 85% by weight of calcium carbonate, grain size from 5 to 35 µm, as a mineral filler;
2 to 12% by weight of a binder comprising polyvinyl acetates and acrylic acid esters in aqueous dispersion;
0.5 to 3% by weight of a silicone derivative as a hydrophobic agent;
0.1 to 0.9% of a cellulose derivative of the methylhydroxyethylcellulose type;
0.1 to 0.6% of a slipping agent of the attapulgite type;
1 to 12% of another silicate derivative as an additional slipping agent;
0.1 to 5% of a polycarboxylic acid ammonium salt as a dispersant;
0.001 to 0.015 of an iron oxide as a pigment;
0.1 to 0.3% of a preparation of N-formoles and isothiazolinones as a biocide;
0.1 to 0.3% of a conventional anti-foaming agent; water up to 100%., The weight percentages given are in relation to the total weight of the coat, unless indicated otherwise.

For comparison requirements, standard boards conforming solely to French standard NF P 72-302 and not comprising the above-defined upper web and pigment layer are assembled by means of a joint coat for a plasterboard of the range of coats "PREGYLYS"®, sold by the Company PLATRES LAFARGE.

The characteristics of the two overall surfaces thus formed are compared by applying the following tests:

(A) Degree of whiteness or reflectance factor R obtained according to standard NFQ 03038 with a wavelength of 457 nm. This degree represents the percentage ratio between of a reflected radiation of the body in question and that of a perfect diffuser under the same conditions.

(B) Surface water absorption obtained, for example, according to the COBB test. In this test, a ring defining an area of 100 cm² is filled with distilled water at 23° C. to a height of approximately 10 mm. The water is left in contact with the overall surface forming the bottom of the ring for one minute, and then the water is emptied and the excess spin-dried. The weight gain of the surface is subsequently determined and brought back to an area of 1 m². In an alternative version, a drop of distilled water of a volume of approximately 0.05 cm³ at 23° C. is deposited on the surface. It is important that the drop be deposited and not allowed to fall from a variable height which consequently would crush it to a greater or lesser extent, thus falsifying the result. The duration in minutes represents the surface absorption of the tested area.

(C) UV radiation resistance obtained by exposing the overall surfaces, in a cabinet comprising eight high pressure mercury vapour lamps, each of 400 watts, to a wavelength which is not less than 290 nm. The surfaces are maintained at a distance of 15 cm from the lamps and at a temperature of 60° C. for 72 hours. The colour deviations delta E* are measured on a spectro-colorimeter according to the standard DIN 6174 at an angle of 8°, illuminant D65 as a bright specular, included in the system L*, a*, b*, in which L* is the luminance, a* represents the transition from green to red, and b* represents the transition from blue to yellow. A point E* in this system, the said point being a function of L*, a*, b*, defines the colorimetry of a sample and the deviation is measured in relation to a reference point. In general terms, a colour deviation beyond 2 becomes discernible to the naked eye.

The results of the tests (A) and (B) are collated in Table I and those of the test (C) are collated in Table II below.

TABLE I

|  | Standard overall surface | Overall surface according to the invention |
|---|---|---|
| Reflectance R (%) | Board: 50 to 60 | Board: 72 to 76 |
|  | Coat: 65 to 85 | Coat: 65 to 85 |
| Absorption | 19 | 13 |
| COBB (g/m²) | Board: 50 | Board: >= 60 |
| Alternative (min) | Coat: 15 | Coat: >= 60 |

This shows that the overall surface according to the present invention is clearly more homogeneous than that of an assembly according to the conventional technique. Moreover, the more homogeneous absorption time of the overall surface makes it possible to use a paint having less covering capacity than that necessary with traditional boards and coats and is also beneficial to the painting operation.

TABLE II

|  | Standard | Invention |
|---|---|---|
| Before Exposure |  |  |
| Initial measurements of the board | L* = 82.94<br>a* = −0.43<br>b* = 4.64 | L* = 90.41<br>a* = −0.03<br>b* = 3.13 |
| Initial measurement of the joint | L* = 90.70<br>a* = 0.73<br>b* = 5.28<br>Board/Joint Colour deviation delta E* = 7.87 | L* = 89.70<br>a* = 0.50<br>b* = 3.60<br>Board/Joint colour deviation delta E* = 1 |
| Exposure to UV for 72 hours |  |  |
| Measurements of the board after exposure | L* = 81.10<br>a* = 0.69<br>b* = 12.93<br>Colour deviation delta E* = 8.56; very substantial yellowing plus chestnut spots | L* = 90.38<br>a* = −0.91<br>b* = 7.40<br>Colour deviation delta E* = 4.36; substantial yellowing |
| Measurements of the joint after exposure | L* = 88.90<br>a* = 0.91<br>b* = 3.83<br>Colour deviation delta E* = 2.32; slight yellowing plus a few chestnut spots | L* = 89.17<br>a* = 0.50<br>b* = 3.19<br>Colour deviation delta E* = 0.67; very slight colour deviation |

This table shows that the colour deviation before exposure to UV is much slighter for an overall surface according to the invention than for an overall surface such as is obtained traditionally.

This table also shows that the change in the colour deviation after exposure to UV is much less pronounced in the overall surface according to the invention than traditionally. In fact, the colour deviation before exposure and after exposure must be as little as possible, so that the overall surface does not give the impression to the naked eye of being spotted or being covered with zones of different shade and brightness.

This is not possible with an overall surface obtained by means of traditional plasterboards and products, but the very slight deviation of the overall surface according to the invention makes it possible to mitigate this disadvantage.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A construction assembly, comprising:
a plurality of plaster boards, each of the plaster boards comprising a plaster body and at least one sheet of liner, the liner including an inner surface attached to the plaster body and an outer surface having an outer face; wherein said plaster boards are assembled creating at least one joint; and
a joint-pointing coat jointing said plaster boards to form a substantially plane outer surface comprising the outer surface of said at least one joint and said outer surface of said liner, wherein the composition of the joint-pointing coat is adapted for the finishing of said at least one joint;
wherein both the joint-pointing coat in the dry state and the outer face of the sheet of liner each have a surface water absorbability which is at least 60 minutes such as measured by the water drop test at 23° C.

2. The construction assembly according to claim 1, wherein colorations of said joint-pointing coat in a dry state and the liner are substantially homogeneous in virtually the entire overall surface and are substantially white.

3. The construction assembly according to claim 1, wherein reflectance factors of said joint-pointing coat in a dry state and the liner are substantially homogeneous in virtually the entire overall surface and are between 70% and 80% for a wavelength of 457 nm.

4. The construction assembly according to claim 3, wherein the reflectance factors are between 72% and 76% for a wavelength of 457 nm.

5. The construction assembly according to claim 1, wherein said joint-pointing coat comprises a mineral filler and a binder.

6. The construction assembly according to claim 5, wherein said joint-pointing coat comprises a mineral filler having a grain size of between 5 and 35 µm.

7. The construction assembly according to claim 5, wherein the mineral filler represents between 50% and 85% of the total weight of said joint-pointing coat.

8. The construction assembly according to claim 5, wherein said joint-pointing coat further comprises a hydrophobic agent, which hydrophobic agent represents between 0.2% and 5% of the total weight of said joint-pointing coat.

9. The construction assembly according to claim 5, wherein said joint-pointing coat comprises an organic binder dispersible in an aqueous phase, which organic binder represents between 1% and 20% of the total weight of said joint-pointing coat.

10. The construction assembly according to claim 9, wherein said organic binder represents between 2% and 12% of the total weight of said joint-pointing coat.

11. The construction assembly according to claim 5, wherein said joint-pointing coat further comprises 1 to 15‰, by weight, of a handling agent.

12. The construction assembly according to claim 11, wherein said handling agent represents 2 to 12‰ of the total weight of said joint-pointing coat.

13. The construction assembly according to claim 11, wherein said handling agent is a water-retaining and thickening agent.

14. The construction assembly according to claim 11, wherein said water-retaining and thickening agent is methylhydroxyethylcellulose.

15. The construction assembly according to claim 5, wherein said joint-pointing coat further comprises 0.1 to 2%, by weight, of at least one slipping agent.

16. The construction assembly according to claim 15, wherein said at least one slipping agent represents 0.1 to 0.6% of the total weight of said joint-pointing coat.

17. The construction assembly according to claim 15, wherein said at least one slipping agent is a clay.

18. A construction assembly, comprising:
a plurality of plaster boards, each of the plaster boards comprising a plaster body and at least one sheet of liner, the liner including an inner surface attached to the plaster body and an outer surface having an outer face; wherein said plaster boards are assembled creating at least one joint; and
a joint-pointing coat jointing said plaster boards to form a substantially plane outer surface comprising the outer surface of said at least one joint and said outer surface of said liner, wherein the composition of the joint-pointing coat is adapted for the finishing of said at least one joint;
wherein both the joint-pointing coat in the dry state and the outer face of the sheet of liner are adapted to form an overall surface having a substantially homogeneous coloration;
wherein the joint-pointing coat comprises, by weight based on the total weight of the joint-pointing coat;
between 50% and 85% of at least one mineral filler of white color, having a grain size of between 5 and 35 µm;
at least one organic binder dispersible in an aqueous phase, which organic binder represents between 1% and 20%;
at least one handling agent;
water up to 100%.

19. The construction assembly according to claim 18, wherein said joint-pointing coat comprises 1 to 15‰, by weight, of a handling agent which is a water-retaining and thickening agent.

20. The construction assembly according to claim 18, wherein said organic binder represents 2 to 12% of the total weight of said joint-pointing coat.

21. The construction assembly according to claim 18, wherein said joint-pointing coat comprises 0.1 to 2%, by weight, of a slipping agent which is a clay.

22. The construction assembly according to claim 18, wherein the reflectance factors of said joint-pointing coat in a dry state and the liner are substantially homogeneous in virtually the entire overall surface and are between 70% and 80% for a wavelength of 457 nm.

23. The construction assembly according to claim 22, wherein the reflectance factors are between 72% and 76% for a wavelength of 457 nm.

24. A construction assembly, comprising:
a plurality of plaster boards, each of the plaster boards comprising a plaster body and at least one sheet of liner, the liner including an inner surface attached to the plaster body and an outer surface having an outer face; wherein said plaster boards are assembled creating at least one joint; and
a joint-pointing coat jointing said plaster boards to form a substantially plane outer surface comprising the outer surface of said at least one joint and said outer surface of said liner, wherein the composition of the joint-pointing coat is adapted for the finishing of said at least one joint;
wherein both the joint-pointing coat in the dry state and the outer face of the sheet of liner each have a surface water absorbability which is at least 60 minutes such as measured by the water drop test at 23° C. and each have a surface having a reflectance factor between 70% and 80% for a wavelength of 457 nm.

25. The construction assembly according to claim 24, wherein the reflectance factor is between 72% and 76% for a wavelength of 457 nm.

26. The construction assembly according to claim 24, wherein said joint-pointing coat comprises a mineral filler and a binder.

27. The construction assembly according to claim 26, wherein said joint-pointing coat comprises a mineral filler having a grain size of between 5 and 35 μm.

28. The construction assembly according to claim 26, wherein the mineral filler represents between 50% and 85% of the total weight of said joint-pointing coat.

29. The construction assembly according to claim 24, wherein said joint-pointing coat further comprises a hydrophobic agent, which hydrophobic agent representing between 0.2% and 5% of the total weight of said joint-pointing coat.

30. The construction assembly according to claim 26, wherein said joint-pointing coat comprises an organic binder dispersible in an aqueous phase, which organic binder represents between 1% and 20% of the total weight of said joint-pointing coat.

31. The construction assembly according to claim 26, wherein said organic binder represents between 2% and 12% of the total weight of said joint-pointing coat.

32. The construction assembly according to claim 24, wherein said joint-pointing coat further comprises 1 to 15‰, by weight, of a handling agent.

33. The construction assembly according to claim 32, wherein said handling agent is a water-retaining and thickening agent.

34. The construction assembly according to claim 24, wherein said joint-pointing coat further comprises 0.1 to 2%, by weight, of at least one slipping agent.

35. The construction assembly according to claim 34, wherein said at least one slipping agent is a clay.

36. A method for the construction of interior works, the method comprising:
assembling a plurality of plasterboards with a joint between adjacent plasterboards, wherein each of the plasterboards includes a plaster body and a sheet of liner and the sheet of liner includes an outer surface;
finishing the joints between the plasterboards with at least one joint-pointing coat; and thereafter
drying said joint-pointing coat on the joints,
wherein both the joint-pointing coat in the dry state and the outer face of the sheet of liner each have a surface water absorbability which is at least 60 minutes such as measured by the water drop test at 23° C.;
whereby forming an overall surface ready to be decorated.

37. The method of claim 36, further comprising the step of painting said overall surface.

38. A method for the construction of interior works, the method comprising:
assembling a plurality of plasterboards with a joint between adjacent plasterboards, wherein each of the plasterboards includes a plaster body and a sheet of liner and the sheet of liner includes an outer surface;
finishing the joints between the plasterboards with at least one joint-pointing coat; and thereafter
drying said joint-pointing coat on the joints,
wherein both the joint-pointing coat in the dry state and the outer face of the sheet of liner are adapted to form an overall surface having a substantially homogeneous coloration;
wherein the joint-pointing coat comprises, by weight based on the total weight of the joint-pointing coat;
between 50% and 85% of at least one mineral filler of white color, having a grain size of between 5 and 35 μm;
at least one organic binder dispersible in an aqueous phase, which organic binder represents between 1% and 20%;
at least one handling agent;
water up to 100%;
whereby the overall surface is ready to be decorated.

39. The method of claim 38, further comprising the step of painting said overall surface.

40. A method for the construction of interior works, the method comprising:
assembling a plurality of plasterboards with a joint between adjacent plasterboards, wherein each of the plasterboards includes a plaster body and a sheet of liner and the sheet of liner includes an outer surface;
finishing the joints between the plasterboards with at least one joint-pointing coat; and thereafter
drying said joint-pointing coat on the joints,
wherein both the joint-pointing coat in the dry state and the outer face of the sheet of liner each have a surface water absorbability which is at least 60 minutes such as measured by the water drop test at 23° C. and each have a surface having a reflectance factor between 70% and 80% for a wavelength of 457 nm
whereby forming an overall surface ready to be decorated.

41. The method of claim 40, further comprising the step of painting said overall surface.

42. A joint-pointing coat which in the dry state of the joint-pointing coat, has a surface having a reflectance factor between 70% and 80% for a wavelength of 457 nm and a surface water absorbability of at least 60 minutes such as measured by the water drop test at 23° C.

43. The joint-pointing coat according to claim 42, wherein the reflectance factor is between 72% and 76% for a wavelength of 457 nm.

44. The joint-pointing coat according to claim 42, comprising a mineral filler and a binder.

45. The joint-pointing coat according to claim 42, comprising a mineral filler having a grain size of between 5 and 35 μm.

46. The joint-pointing coat according to claim 44, wherein the mineral filler represents between 50% and 85% of the total weight of said joint-pointing coat.

47. The joint-pointing coat according to claim 42, further comprising a hydrophobic agent, which hydrophobic agent representing between 0.2% and 5% of the total weight of said joint-pointing coat.

48. The joint-pointing coat according to claim 44, comprising an organic binder dispersible in an aqueous phase, which organic binder represents between 1% and 20% of the total weight of said joint-pointing coat.

49. The joint-pointing coat according to claim 48, wherein said organic binder represents between 2% and 12% of the total weight of said joint-pointing coat.

50. The joint-pointing coat according to claim 42, further comprising 1 to 15‰, by weight, of a handling agent.

51. The joint-pointing coat according to claim 50, wherein said handling agent is a water-retaining and thickening agent.

52. The joint-pointing coat according to claim 51, wherein said water-retaining and thickening agent is methylhydroxyethylcellulose.

53. The joint-pointing coat according to claim 42, further comprising 0.1 to 2%, by weight, of at least one slipping agent.

54. The joint-pointing coat according to claim 53, wherein said at least one slipping agent is a clay.

55. A joint-pointing coat comprising at least a mineral filler and a binder, and which in the dry state of the joint-pointing coat, has a surface having a reflectance factor between 70% and 80% for a wavelength of 457 nm and a surface water absorbability of at least 60 minutes such as measured by the water drop test at 23° C.

* * * * *